US010903703B2

(12) United States Patent
Takano et al.

(10) Patent No.: US 10,903,703 B2
(45) Date of Patent: Jan. 26, 2021

(54) ROTOR, ROTATING ELECTRICAL MACHINE AND PRODUCTION METHOD OF COVER TUBE

(71) Applicant: FANUC CORPORATION, Yamanashi (JP)

(72) Inventors: Shinobu Takano, Yamanashi (JP); Takafumi Kajiya, Yamanashi (JP); Hisashi Maeda, Yamanashi (JP); Kaname Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 174 days.

(21) Appl. No.: 16/147,597

(22) Filed: Sep. 29, 2018

(65) Prior Publication Data

US 2019/0109502 A1 Apr. 11, 2019

(30) Foreign Application Priority Data

Oct. 5, 2017 (JP) .................... 2017-195132
Nov. 21, 2017 (JP) .................... 2017-223398

(51) Int. Cl.
| | | |
|---|---|---|
| *H02K 1/27* | (2006.01) | |
| *H02K 5/20* | (2006.01) | |
| *H02K 9/19* | (2006.01) | |
| *H02K 1/28* | (2006.01) | |
| *H02K 15/03* | (2006.01) | |

(52) U.S. Cl.
CPC .............. *H02K 1/278* (2013.01); *H02K 1/28* (2013.01); *H02K 5/20* (2013.01); *H02K 9/19* (2013.01);
(Continued)

(58) Field of Classification Search
CPC .......... H02K 1/27–1/2793; H02K 1/28; H02K 5/20; H02K 9/19; H02K 15/03; H02K 2213/03
See application file for complete search history.

(56) References Cited

U.S. PATENT DOCUMENTS 5,457,870 A * 10/1995 Canders ................. H02K 1/278
156/294
5,744,887 A * 4/1998 Itoh ....................... H02K 1/278
310/156.28
(Continued)

FOREIGN PATENT DOCUMENTS

JP 2009-017708 A 1/2009
JP 2009017708 A * 1/2009
(Continued)

OTHER PUBLICATIONS

Machine Translation,Takimoto, JP-2009017708-A, Jan. 2009. (Year: 2009).*

(Continued)

*Primary Examiner* — Thomas Truong
(74) *Attorney, Agent, or Firm* — Studebaker & Brackett PC

(57) ABSTRACT

A rotor includes: a rotary member; a plurality of permanent magnets arranged on an outer circumferential side of the rotary member; and a cover tube provided on an outer circumferential surface side of the plurality of the permanent magnets, and formed by a tape-like fiber bundle in which a plurality of thread-like fibers aligned in one direction is bundled smoothly by resin, in which the cover tube is formed so that the tape-like fiber bundle circles in a spiral pattern along the circumferential direction, and the tape-like fiber bundle arranges along the axial direction, and a circling-start end face and a circling-end end face of the tape-like fiber bundle face the axial direction of the cover tube.

7 Claims, 10 Drawing Sheets

(52) U.S. Cl.
CPC ......... *H02K 15/03* (2013.01); *H02K 2213/03* (2013.01)

(56) References Cited

U.S. PATENT DOCUMENTS

2016/0111926 A1* 4/2016 Arimatsu ................. H02K 1/28
                                                        310/156.31
2016/0315514 A1* 10/2016 Eckert ................. H02K 1/2706

FOREIGN PATENT DOCUMENTS

| JP | 2011-529681 A | | 12/2011 |
|----|---------------|---|---------|
| JP | 2012-077365 A | | 4/2012 |
| JP | 2016-082773 A | | 5/2016 |
| JP | 2016-100974 A | | 5/2016 |
| JP | 2016100974 A | * | 5/2016 |
| WO | 2010/014646 A2 | | 2/2010 |

OTHER PUBLICATIONS

Machine Translation, Ogasawara, JP-2016100974-A, May 2016. (Year: 2016).*

"smooth, adj." OED Online. Oxford University Press, Jun. 2020. Web. Jul. 3, 2020. (Year: 2020).*

An Office Action mailed by the Japanese Patent Office dated Nov. 19, 2019, which corresponds to Japanese Patent Application No. 2017-223398 and is related to U.S. Appl. No. 16/147,597.

* cited by examiner

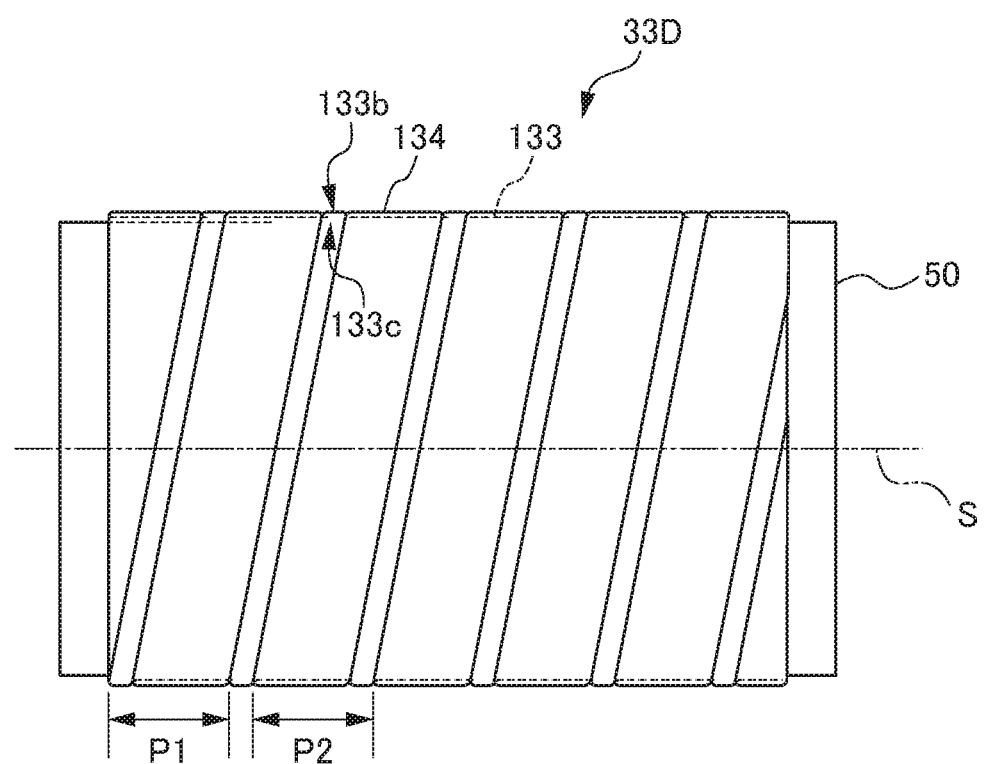

ROTOR, ROTATING ELECTRICAL MACHINE AND PRODUCTION METHOD OF COVER TUBE

This application is based on and claims the benefit of priority from Japanese Patent Application Nos. 2017-195132 and 2017-223398, respectively filed on 5 Oct. 2017 and 21 Nov. 2017, the contents of which are incorporated herein by reference.

BACKGROUND OF THE INVENTION

Field of the Invention

The present invention relates to a rotor, a rotating electrical machine including a rotor, and a production method of a cover tube.

Related Art

As one type of rotating electrical machine using permanent magnets in the rotor, the SPM (Surface Permanent Magnet)-type electric motor which arranges permanent magnets at the outer circumferential side of a rotary member (sleeve, rotary shaft, etc.) has been known. In this type of SPM electric motor, a cover tube is installed so as to cover the outer circumference of the permanent magnets for suppressing the permanent magnets from flying off from the rotor due to centrifugal force, during high-speed rotation caused by increasing the revolution speed. As the material forming the cover tube, fiber reinforced resins (FRP) are widely used, and particularly, carbon fiber reinforced resins (hereinafter referred to as "CFRP") are often used, for reasons such as having high strength and being light weight.

Conventionally, as a method of producing a CFRP cover tube, for example, a method of wrapping sheet-like CRPF on a fixture serving as a core to establish in cylindrical form has been known. (hereinafter referred to as "sheet winding"). However, with sheet winding, since a step can be made in portions of winding start and winding end of the CFRP, the fibers do not extend straight ahead at this portion and meandering occurs. At the portion in which meandering occurs in the fibers, since the strength of the cover tube declines more than a portion in which meandering does not occur in the fibers, it iii difficult to appropriately accept the stresses upon the rotor rotating. Therefore, a method has been proposed (for example, refer to Patent Document 1) of winding tape-like CFRP (the CFRP fiber bundle described later) in a spiral pattern along the circumferential direction of the fixture to establish in a cylindrical shape (hereinafter referred to as "tape winding").

Patent Document 1: Japanese Unexamined Patent Application, Publication No. 2016-82773

SUMMARY OF THE INVENTION

With the above-mentioned tape winding described in Patent Document 1, since a step can be made at the portions of winding start and winding end of the tape-like CFRP, the strength at this portion is considered to decline, similarly to the case of sheet winding. In addition, since the end faces at winding start and winding end of the tape-like CFRP have a cut face exposed in the circumferential direction of the rotor, in the case of the adhesive strength of the end face not being sufficient, the end face is considered to peel off by the wind pressure upon the rotor rotating.

The object of the present invention is to provide a rotor, rotating electrical machine and production method of a cover tube that can suppress the decline in strength of the cover tube and peeling of the end face thereof.

A first aspect of the present invention relates to a rotor (for example, the rotor 30 described later), including: a rotary member (for example, the sleeve 31 described later); a plurality of permanent magnets (for example, the permanent magnet 32 described later) arranged on an outer circumferential side of the rotary member; and a cover tube (for example, the cover tube 33 described later) provided on an outer circumferential surface side of the plurality of the permanent magnets, and formed by a tape-like fiber bundle (for example, the CFRP fiber bundle 133 described later) in which a plurality of thread-like fibers aligned in one direction is bundled smoothly by resin; in which the cover tube is formed so that the tape-like fiber bundle circles in a spiral pattern along the circumferential direction (for example, the circumferential direction DR described later), and the tape-like fiber bundle arranges along the axial direction (for example, direction along rotary axis line S described later) and in which a circling-start end face and a circling-end end face of the tape-like fiber bundle face the axial direction of the cover tube.

According to a second aspect of the present invention, in the rotor as described in the first aspect, the tape-like fiber bundle of the cover tube may be arranged at intervals so as not to overlap along the axial direction.

According to a third aspect of the present invention, in the rotor as described in the first or second aspect, the cover tube may include: a first layer in which the tape-like fiber bundle circles in a spiral pattern continuously from one end to the other end in the axial direction; and a second layer in which the tape-like fiber bundle circles in a spiral pattern continuously from the other end to the one end in the axial direction, in which the first layer and the second layer are alternately layered in the radial direction of the cover tube.

According to a fourth aspect of the present invention, in the rotor as described in the third aspect, in the cover tube, the tape-like fiber bundle (133) forming the first layer and the tape-like fiber bundle (133) forming the second layer may have respectively different angles (for example angles θ1,θ2 described later) of intersecting with the axial direction.

According to a fifth aspect of the present invention, in the rotor as described in the third or fourth aspect, in the cover tube, the tape-like fiber bundle forming the first layer and the tape-like fiber bundle forming the second layer may have respectively different widths (for example, the widths W1, W2 described later).

According to a sixth aspect of the present invention, in the rotor as described in any one of the third to fifth aspects, in the cover tube, in the cover tube, the tape-like fiber bundle forming the first layer and the tape-like fiber bundle forming the second layer may have respectively different thicknesses (for example, the thicknesses T1, T2 described later).

A seventh aspect of the present invention relates to a rotating electric machine (for example, the electric motor 1 described later) including: the rotor as described in any one of the first to sixth aspects; and a stator (for example, the stator 20 described later) provided at the outer circumferential side of the rotor.

An eighth aspect of the present invention relates to a production method of a cover tube provided on an outer circumferential surface of a rotor to which a plurality of permanent magnets is arranged on an outer circumferential side, the production method including the steps of: upon winding in a spiral pattern a fiber bundle, in which a plurality of thread-like fiber reinforced resin arranged is bundled smoothly, along the circumferential direction of a rotary member or a cylindrical fixture (for example, the fixture 50 described later), and arranging the tape-like fiber bundle along the axial direction of the rotary member or the cylindrical fixture, obliquely cutting a winding-start end face (for example, the winding-start end face 133s described later) and a winding-end end face (for example, the winding-end end face 133e described later) of the tape-like fiber bundle so that the winding-start end face and the winding-end end face of the tape-like fiber bundle are orthogonal to the axial direction of the cover tube; and orienting the winding-start end face and the winding-end end face of the tape-like fiber bundle in the axial direction of the cover tube, by winding in a spiral pattern the tape-like fiber bundle along the circumferential direction of the rotary member or the cylindrical fixture, and arranging the tape-like fiber bundle along the axial direction of the rotary member or the cylindrical fixture.

A ninth aspect of the present invention relates to a production method of a cover tube provided on an outer circumferential surface of a rotor to which a plurality of permanent magnets is arranged on an outer circumferential side, the production method comprising the steps of: winding in a spiral pattern a fiber bundle, in which a plurality of thread-like fiber reinforced resin is bundled smoothly, along the circumferential direction of a rotary member or a cylindrical fixture, and arranging the tape-like fiber bundle along the axial direction of the rotary member or the cylindrical fixture; and obliquely cutting a winding-start end and a winding-end end of the tape-like fiber bundle which was wound on the rotary member or the cylindrical fixture, in a direction orthogonal to the axial direction of the rotary member or the cylindrical fixture.

According to the present invention, it is possible to provide a rotor, rotating electrical machine and production method of a cover tube that can suppress the decline in strength of the cover tube and peeling of the end face thereof.

BRIEF DESCRIPTION OF THE DRAWINGS

FIG. 7C is a schematic diagram showing a third configuration of a cover tube 33D according to a fifth embodiment.

DETAILED DESCRIPTION OF THE INVENTION

Figure 1:
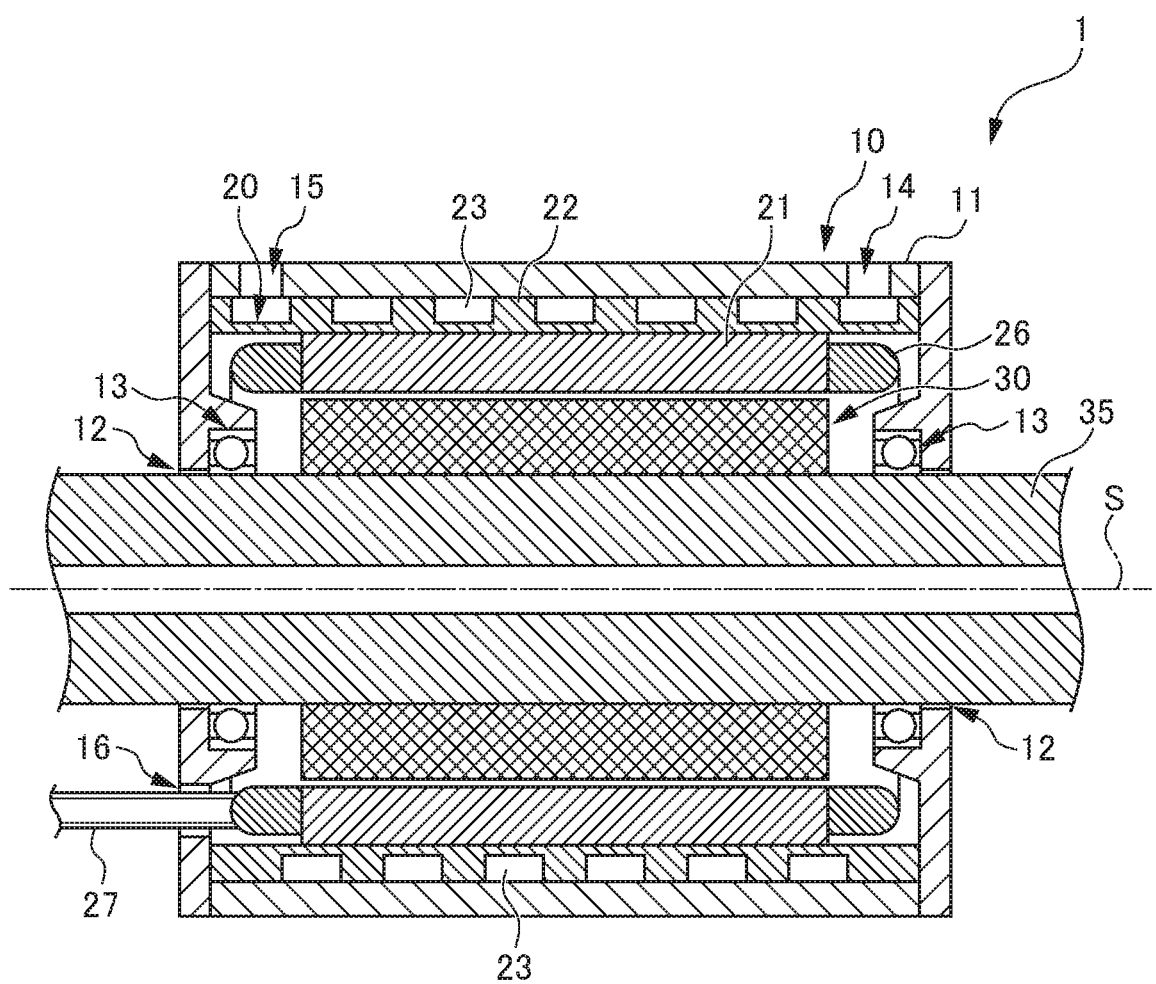
FIG. 1 is a cross-sectional view showing the configuration of an electric motor 1 according to a first embodiment.

Hereinafter, embodiments of the present invention will be explained. It should be noted that the drawings attached to the present specification are all schematic diagrams, and the shape of each part, scaling, length/width dimensional ratios, etc. are modified or exaggerated in consideration of the easy of understanding, etc. In addition, in the drawings, hatching indicating the cross-section of a member is omitted as appropriate.

In the present specification, etc., the terminology specifying the shape, geometrical requirements, and extents of these, i.e. terminology such as "parallel" and "direction", in addition to the strict meanings of this terminology, also has a scope of an extent considered as substantially parallel, and a scope considered as the rough direction thereof. In the present specification, etc., the line serving as the rotation center of the rotary shaft 35 described later is abbreviated as "rotary axis line S", and the direction along this rotary axis line S is also referred to as "axial direction". The definitions of this "rotary axis line S" and "axial direction" are not limited to the rotary shaft 35, and are also used for the iron core 21, rotor 30, sleeve 31, permanent magnet 32, cover tube 33, fixture 50, etc. described later. In the present specification, etc., a tape-like fiber bundle in which a plurality of thread-like carbon fibers (CF) arranged in one direction are smoothly bundled by resin is referred to as "CFRP fiber bundle", and the thread-like (one) carbon fiber impregnated by resin is referred to as "thread-like CFRP". In addition, carbon fiber included in the CFRP fiber bundle or thread-like CRPF is simply referred to as "fiber".

First Embodiment

First, an electric motor 1 serving as the rotating electrical machine equipped with the rotor 30 of the first embodiment will be explained. FIG. 1 is a cross-sectional view showing the configuration of an electric motor 1 according to the first embodiment. It should be noted that the configuration of the electric motor 1 shown in FIG. 1 may be any configuration so long as the rotor 30 of the embodiment is applicable.

As shown in FIG. 1, the electric motor 1 includes a frame 10, a stator 20, the rotor 30, the rotary shaft 35, and bearings 13, as main constituent elements. The frame 10 is an external member of the electric motor 1, and includes a frame main body 11, and shaft hole 12.

The frame main body 11 is a housing that encloses as well as retains the stator 20. The frame main body 11 retains the rotor 30 via the bearings 13. The frame main body 11 includes a supply opening 14, discharge opening 15 and hole 16. The supply opening 14 is an aperture for supplying coolant to a flow channel 23 of a stator frame 22, and is connected to a feed tube (not illustrated) for coolant. The discharge opening 15 is an aperture for discharging coolant having flowed through the flow channel 23, and is connected to a discharge pipe (not illustrated) for coolant. The hole 16 is an aperture for passing through electrical wires 27 drawn from the stator 20. The shaft hole 12 is a hole through which the rotary shaft 35 (described later) passes.

The stator 20 is a composite member forming a rotating magnetic field for causing the rotor 30 to rotate. The stator 20 is formed in a cylindrical shape as a whole, and is fixed to the inside of the frame 10. The stator 20 includes the iron core 21 and stator frame 22.

The iron core 21 is a member capable of arranging a winding 26 on the inside. The iron core 21 is formed a cylindrical stage, and arranged on the inside of the stator frame 22. In the iron core 21, a plurality of grooves (not illustrated) is formed in the inner surface, and the winding 26 is arranged in these grooves. It should be noted that a part of the winding 26 protrudes from both ends of the iron core 21 in the axial direction of the iron core 21. The iron core 21 is prepared by stacking up a plurality of thin sheets such as of electromagnetic steel sheets to establish a laminate body, and integrating this laminate body by adhering, calking, etc.

The stator frame 22 is a member that retains the iron core 21 on the inside thereof. The stator frame 22 is formed in a cylindrical shape, and arranged on the outside of the stator 20. The iron core 21 is firmly joined with the stator frame 22, in order to accept the stresses arising from the torque of the rotor 30. As shown in FIG. 1, the stator frame 22 of the present embodiment includes, at the outside surface, the flow channel 23 for cooling the heat transferred from the iron core 21. The flow channel 23 is a single or many spiral grooves in the outside surface of the stator frame 22. The coolant (not illustrated) supplied from the feed port 14 of the frame main body 11 (frame 10), after flowing through the inside of the flow channel 23 so as to follow the outside surface of the stator frame 22 in a spiral pattern, discharges to outside from the discharge port 15 of the frame main body 11.

From the iron core 21 of the stator 20, the electrical wire 27 electrically connected to the winding 26 is drawn. This electrical wire 27 is connected to the power source (not illustrated) installed outside of the electric motor 1. During operation of the electric motor 1, for example, the 3-phase AC current is supplied to the iron core 21, whereby a rotating magnetic field for rotating the rotor 30 is formed.

The rotor 30 is a component which rotates by way of the magnetic interaction with the rotating magnetic field formed by the stator 20. The rotor 30 is provided on the inner circumferential side of the stator 20. The configuration of the rotor 30 will be described later.

The rotary shaft 35 is a member supporting the rotor 30. The rotary shaft 35 is inserted so as to pass through the axis center of the rotor 30, and is fixed to the rotor 30. A pair of the bearings 13 is fitted to the rotary shaft 35. The bearings 13 are members which rotatably support the rotary shaft 35, and provided in the frame main body 11. The rotary shaft 35 is rotatably supported around the rotary axis line S by the frame main body 11 and bearings 13. In addition, the rotary shaft 35 passes through the shaft hole 12, for example, and is connected to a cutting fixture, power transmission, gear reduction, etc. (not illustrated) installed outside.

In the electric motor 1 shown in FIG. 1, when supplying 3-phase AC current to the stator 20 (iron core 21), a torque is produced at the rotor 30 by way of the magnetic interaction between the stator 20 in which a rotating magnetic field is formed and the rotor 30, and this torque is outputted to outside via to the rotary shaft 35. It should be noted that, in the present embodiment, although the electric motor 1 is explained as an SPM-type synchronous electric motor described above, the electric motor 1 may be an IPM (Interior Permanent Magnet)-type synchronous electric motor, for example.

Figure 2:
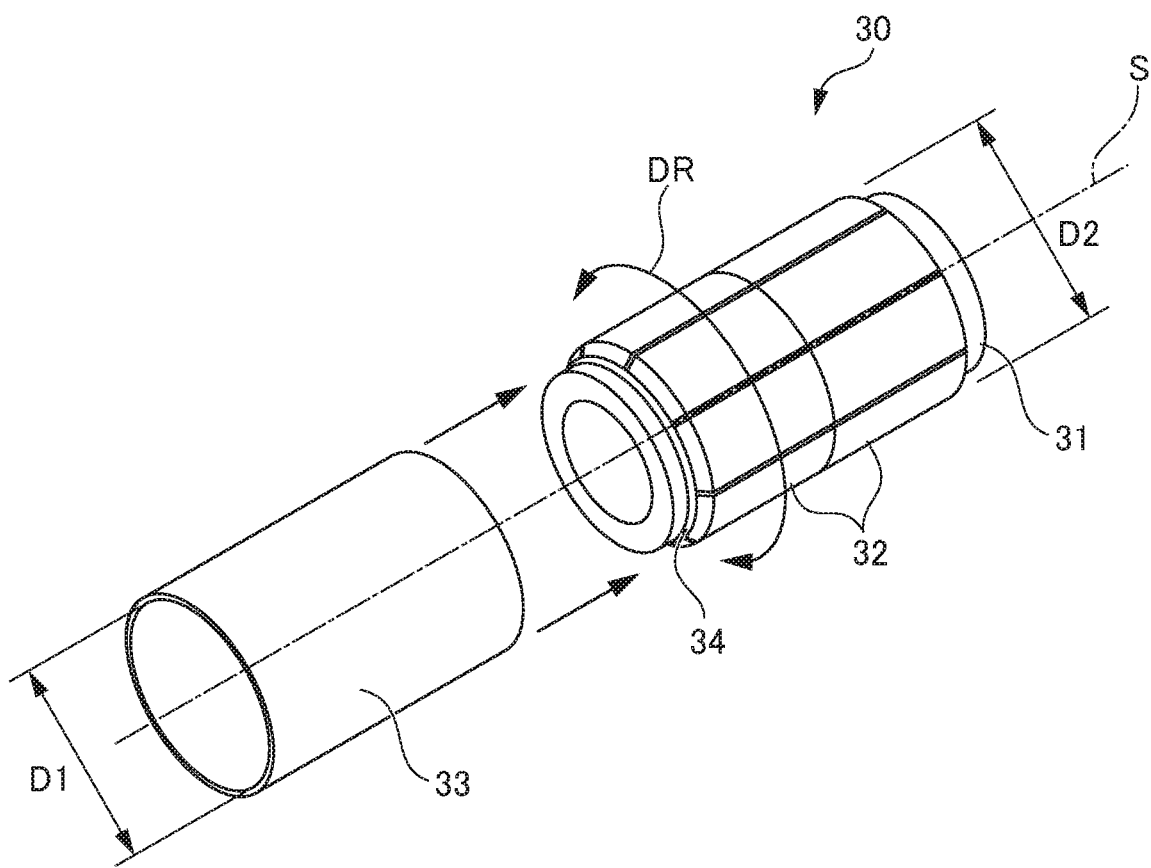
FIG. 2 is an exploded perspective view of a rotor 30.

Next, the configuration of the rotor 30 will be explained. FIG. 2 is an exploded perspective view of the rotor 30. As shown in FIG. 2, the rotor 30 includes a sleeve (rotary member) 31, permanent magnets 32, and cover tube 33. The sleeve 31 is a member of substantially cylindrical shape in which a plurality of permanent magnets 32 are attached, and is provided between the rotary shaft 35 (refer to FIG. 1) and the plurality of permanent magnets 32. The plurality of permanent magnets 32 is arranged along the circumferential direction DR of the sleeve 31. The sleeve 31 is formed by a magnetic material such as carbon steel, for example. The rotor 30 having the sleeve 31 on the inner circumferential side is fitted to the outer circumference of the rotary shaft 35 by way of interference fitting. It should be noted that, in the present specification, etc., the arrow of circumferential direction DR shown in FIG. 2 is applied not only to the sleeve 31, but also to the permanent magnets 32 and cover tube 33.

The permanent magnets 32 are members generating a magnetic field, and as shown in FIG. 2, are aligned along the circumferential direction DR at the outer circumferential side of the sleeve 31 (only four on near side illustrated in FIG. 2). Among the eight rows of the permanent magnets 32, N-pole permanent magnets 32 and S-pole permanent magnets 32 are alternately arranged in the circumferential direction DR of the sleeve 31. The permanent magnets 32 are affixed via an adhesive layer 34 to the outer circumferential surface of the sleeve 31. The present embodiment shows an example in which each row of permanent magnets 32 is divided in two along the axial direction of the rotor 30; however, it is not limited thereto, and the permanent magnets 32 may be divided into three or more along the longitudinal direction of the rotor 30, or may not be divided.

The cover tube 33 is a member of cylindrical shape for covering the plurality of permanent magnets 32. The cover tube 33 is mounted to the outer circumferential surface of the permanent magnets 32 arranged on the sleeve 31. By mounting the cover tube 33 on the outer circumferential surface of the permanent magnets 32, it is possible to suppress the permanent magnets 32 from falling off from the rotor 30 due to the circumferential force produced by rotation of the rotor 30.

The cover tube 33 is molded by winding a tape-like CFRP fiber bundle while applying tension on a cylindrical fixture, as described later. As the material fiber serving as the source of the CFRP fiber bundle, carbon fiber is preferable; however, other than carbon fiber, for example, it is possible to use material having high specific strength such as glass fiber, aramid fiber, silicon carbide fiber, boron fiber, and titanium alloy fiber.

To mount the cover tube 33 to the rotor 30, for example, it is possible to use a technique which spreads out the cover tube provided on the outer circumferential side of the sleeve to the outer side by inserting the sleeve having the tapered surface to the outer circumferential surface of the rotary axis having the same tapered surface (refer to Japanese Unexamined Patent Application, Publication No. 2016-82773, etc.). By using such a technique, it is possible to mount the cover tube 33 to the rotor 30, by the contractile force which depends on the interference. In the cover tube 33, a sufficient counterforce to retain the permanent magnets 32 thereby acts towards the inner side in the radial direction, opposing the centrifugal force produced upon the rotor 30 rotating. In this way, by the counterforce acting towards the inner side in the radial direction of the cover tube 33, the permanent magnets 32 are suppressed from falling off from the rotor 30 due to centrifugal force. Inner side in the radial direction is a direction approaching the rotary axis line S from the outside of the rotor 30.

It should be noted that interference is a dimension of an amount (D2−D1) by which the outside diameter D2 of the permanent magnets 32 arranged on the sleeve 31 exceeds the inside diameter D1 of the cover tube 33 prior to being expanded in diameter (prior to mounting), as shown in FIG. 2. Although it becomes more difficult to mount the cover tube 33 on the outer circumferential surface of the permanent magnets 32 as this interference increases, it is possible to cause a greater counterforce to act towards the inner side in the radial direction from the mounted cover tube 33.

Figure 3A:
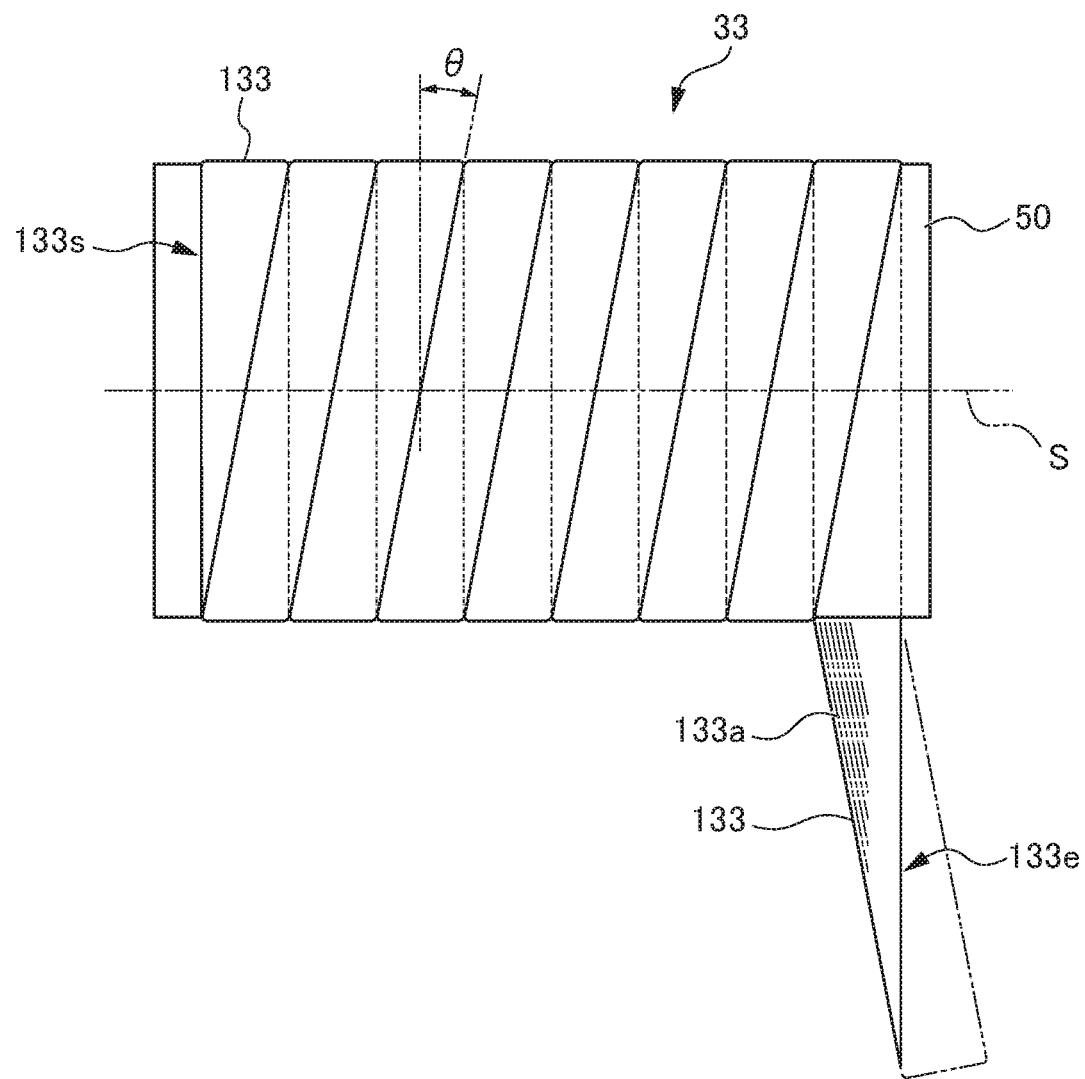
FIG. 3A is a schematic diagram showing a step of producing a cover tube 33 according to the first embodiment.
Figure 3B:
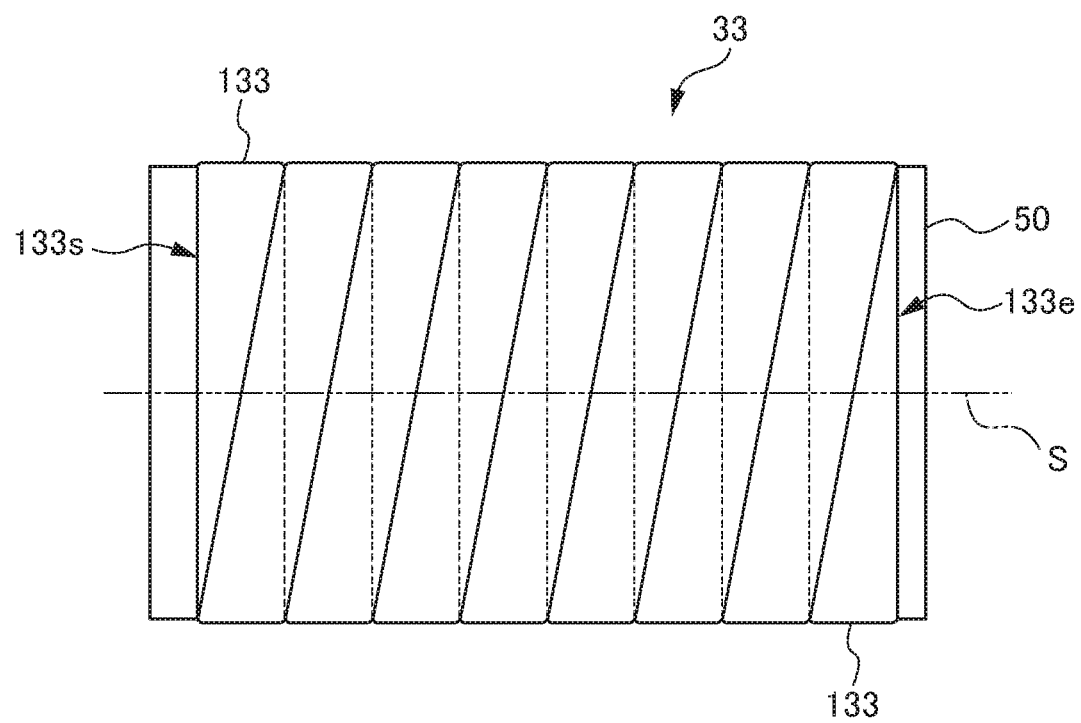
FIG. 3B is a schematic diagram showing a step of producing a cover tube 33 according to the first embodiment.

Next, the configuration of the cover tube 33 according to the first embodiment will be explained. FIGS. 3A and 3B are respectively schematic diagrams showing a process of producing the cover tube 33 according to the first embodiment. The cover tube 33 of the first embodiment is molded by winding a tape-like CFRP fiber bundle 133 on the outer circumferential surface of a fixture (cylindrical fixture) 50, as shown in FIG. 3A. More specifically, the CFRP fiber bundle 133 is wound in a spiral pattern along the circumferential direction DR (refer to FIG. 2) of the fixture 50, and arranged along the axial direction of the fixture 50. The cover tube 33 is completed by winding the CFRP fiber bundle 133 on the fixture 50, and after the impregnating resin cures, removing the fixture 50.

The arrangement direction of the thread-like CFRP 133a constituting the CFRP fiber bundle 133 becomes parallel to the longitudinal direction of the CFRP fiber bundle 133 (same for other embodiments). In addition, an angle θ at which the longitudinal direction of the CFRP fiber bundle 133 intersects with a line orthogonal to the rotary axis line S of the fixture 50 is the range of 0°<θ<90°.

In the present embodiment, the length in the longitudinal direction and width of the CFRP fiber bundle 133 are set according to the length in the axial direction of the cover tube 33, number of winding of the CFRP fiber bundle 133, etc. In addition, the CFRP fiber bundle 133 is wound so that the side faces do not overlap along the axial direction of the cover tube 33 and no gaps are formed (mutual for second to fourth embodiments described later).

In the present embodiment, the winding-start end face 133s and winding-end end face 133e (hereinafter abbreviated as "both end faces") are formed at the winding start and winding end portions of the CFRP fiber bundle 133. Both end faces of the CFRP fiber bundle 133 are cut sections formed obliquely relative to the longitudinal direction of the CFRP fiber bundle 133, so as to be orthogonal with the rotary axis line S, respectively, upon winding the CFRP fiber bundle 133 around the fixture 50. It should be noted that FIG. 3A shows the contour of the CFRP fiber bundle 133 prior to cutting at the winding finish portion by a two-dot chain line.

In the cover tube 33 of the present embodiment, the winding-start end face 133s and winding-end end face 133e are formed in advance at winding start and winding end portions of the CFRP fiber bundle 133, respectively. For this reason, as shown in FIG. 3B, when winding the CFRP fiber bundle 133 around the fixture 50, the cover tube 33 is molded so that the CFRP fiber bundle 133 circles along the circumferential direction DR (refer to FIG. 2), and the CFRP fiber bundle 133 arranges along the axial direction. Then, both end faces (133s, 133e) of the CFRP fiber bundle 133 in the cover tube 33 become a state facing the axial direction.

The production method of the cover tube 33 according to the present embodiment can be applied also for the third to fifth embodiments described later.

In the aforementioned cover tube 33 of the first embodiment, since both end faces of the CFRP fiber bundle 133 face the axial direction of the cover tube 33, a step will not arise at the winding-start and winding-end portions of the tape-like CFRP fiber bundle 133. According to this, at the winding-start and winding-end portions of the CFRP fiber bundle 133, since the fibers extend straight ahead and crawling does not arise, a decline in the strength of the cover tube 33 can be suppressed. Therefore, it is possible to appropriately accept the stresses upon the rotor 30 rotating. In addition, in the cover tube 33 of the first embodiment, at both end faces of the CFRP fiber bundle 133, the cut surfaces are not exposed in the circumferential direction DR of the rotor 30. For this reason, even if assuming that the adhesive strength of end faces were not sufficient, it is possible to suppress the end faces from peeling off due to wind pressure upon the rotor 30 rotating.

Second Embodiment

Next, the configuration of a cover tube 33A of the second embodiment will be explained. The second embodiment differs from the first embodiment in the production method of the cover tube 33A. In the cover tube 33A of the second embodiment, other configurations are the same as the first embodiment. For this reason, FIGS. 4A to 4C omit illustration of the rotor 30 (refer to FIG. 2) to which the cover tube 33A is applied. In addition, in the explanations and drawings of the second embodiment, the same reference symbols as the first embodiment are attached to members, etc. that are similar to the first embodiment, and otherwise redundant explanations are omitted.

Figure 4A:
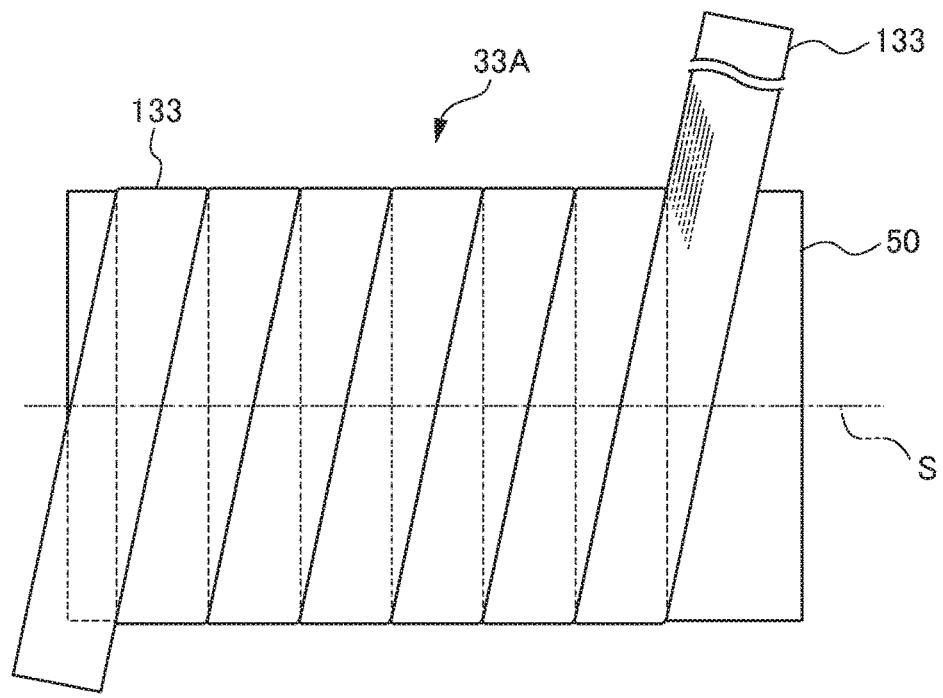
FIG. 4A is a schematic diagram showing a step of producing a cover tube 33A according to a second embodiment.
Figure 4B:
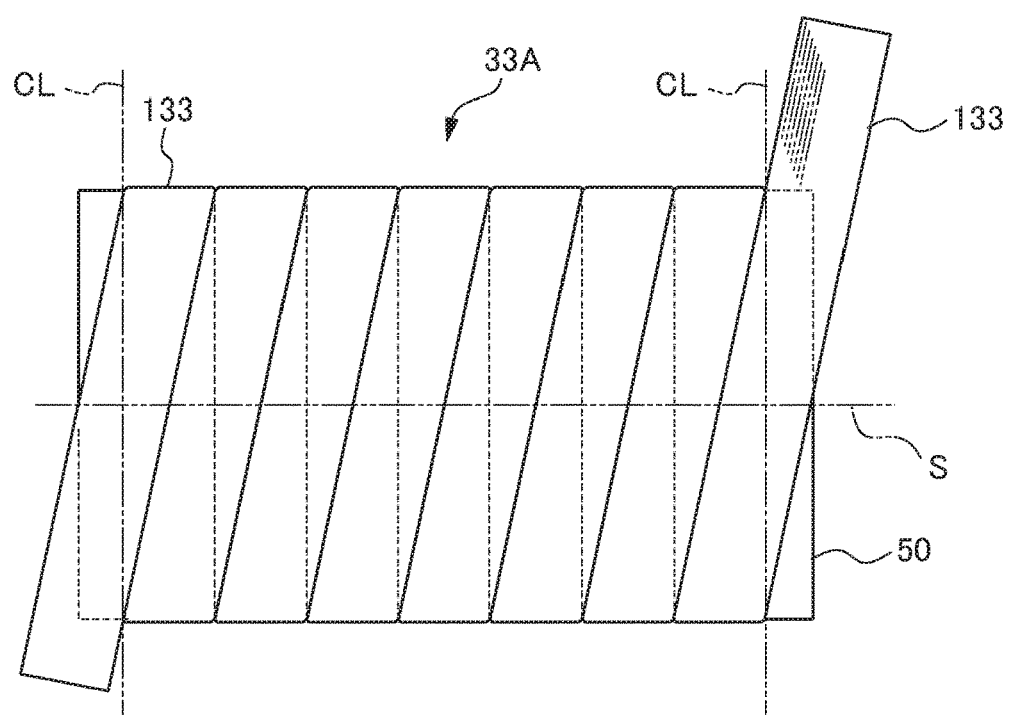
FIG. 4B is a schematic diagram showing a step of producing a cover tube 33A according to a second embodiment.
Figure 4C:
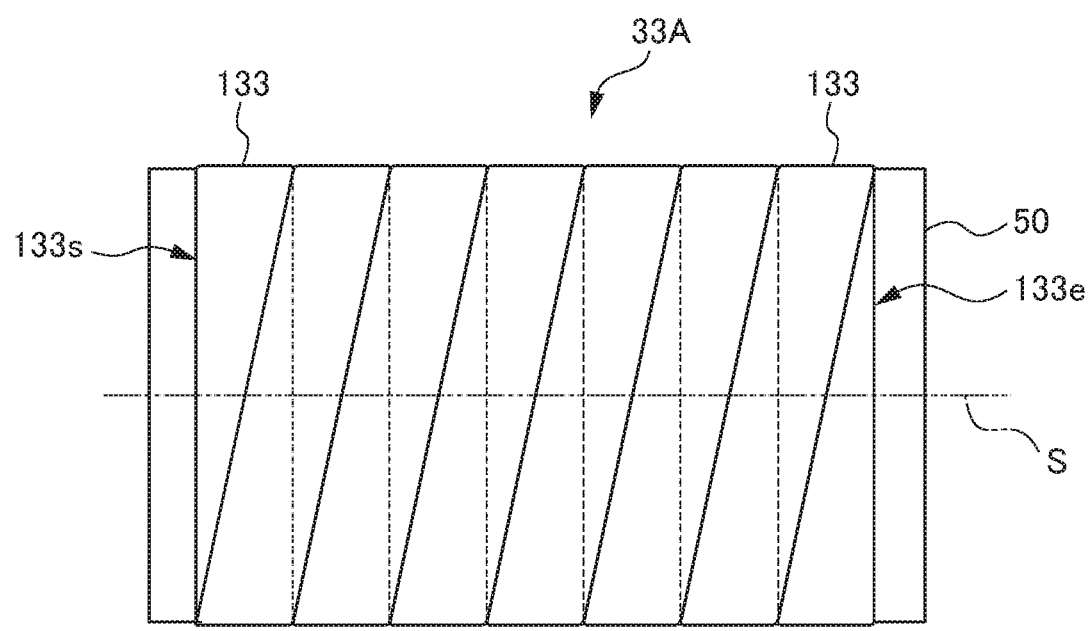
FIG. 4C is a schematic diagram showing a step of producing a cover tube 33A according to a second embodiment.

FIGS. 4A, 4B and 4C are schematic diagrams showing the processes of producing the cover tube 33A of the second embodiment, respectively. The cover tube 33A of the second embodiment is molded by winding the CFRP fiber bundle 133 in which the winding-start and winding-end end faces are not cut, around the outer circumferential surface of the fixture 50, as shown in FIG. 4A. The CFRP fiber bundle 133 is wound while applying tension around the outer circumferential surface of the fixture 50.

After winding the CFRP fiber bundle 133 around the fixture 50, and prior to the resin curing, the winding-start and winding-end portions of the CFRP fiber bundle 133 are cut along the cut line CL, as shown in FIG. 4B. The cut line CL is a virtual line set in a direction orthogonal to the rotary axis line S. When cutting the winding-start and winding-end portions of the CFRP fiber bundle 133 along the cut line CL, the winding-start end face 133s is formed at the winding-start portion of the CFRP fiber bundle 133, and the winding-end end face 133e is formed at the winding-end portion of the CFRP fiber bundle 133, as shown in FIG. 4C. These both end faces are cut surfaces obliquely formed relative to the longitudinal direction of the CFRP fiber bundle 133, respectively, as shown in FIG. 4B, and become surfaces orthogonal to the rotary axis line S, respectively, in the cover tube 33A, as shown in FIG. 4C.

In the cover tube 33A of the present embodiment, the CFRP fiber bundle 133, the winding-start end face 133s and winding-end end face 133e are respectively formed at the winding-start and winding-end portions after winding around the fixture 50. For this reason, the cover tube 33A is molded so that the CFRP fiber bundle 133 circles along the circumferential direction, and the CFRP fiber bundle 133 arranges along the axial direction, as shown in FIG. 4C. Then, both end faces (133s, 133e) of the CFRP fiber bundle 133 in the cover tube 33A are surfaces orthogonal to the rotary axis line S, respectively, and enter a state facing the axial direction. The production method of the cover tube 33 in the present embodiment can be applied also to the third to fifth embodiments described later.

Also in the aforementioned cover tube 33A of the second embodiment, both end faces of the CFRP fiber bundle 133 are facing the axial direction, and the cut surfaces are not exposed in the circumferential direction DR (refer to FIG. 2) of the rotor 30. For this reason, similarly to the first embodiment, it is possible to suppress a decline in strength of the cover tube 33A and the end face of the of the CFRP fiber bundle 133 from peeling off.

In addition, in the cover tube 33A of the second embodiment, the CFRP fiber bundle 133 is cut in a state leaving the winding-start portion. For this reason, prior to starting winding of the CFRP fiber bundle 133 around the fixture, the leftover winding-start portion is fixed by a utensil or the like, whereby it is possible to wind the CFRP fiber bundle 133 around the fixture 50 while applying greater tension. According to this, the CFRP fiber bundle 133 is wound around the fixture 50 in a state in which more fibers extend straight ahead. Therefore, in the cover tube 33A, since it is made possible to accept stresses by more fibers, it is possible to further raise the strength of the cover tube 33A.

Third Embodiment

Figure 5A:
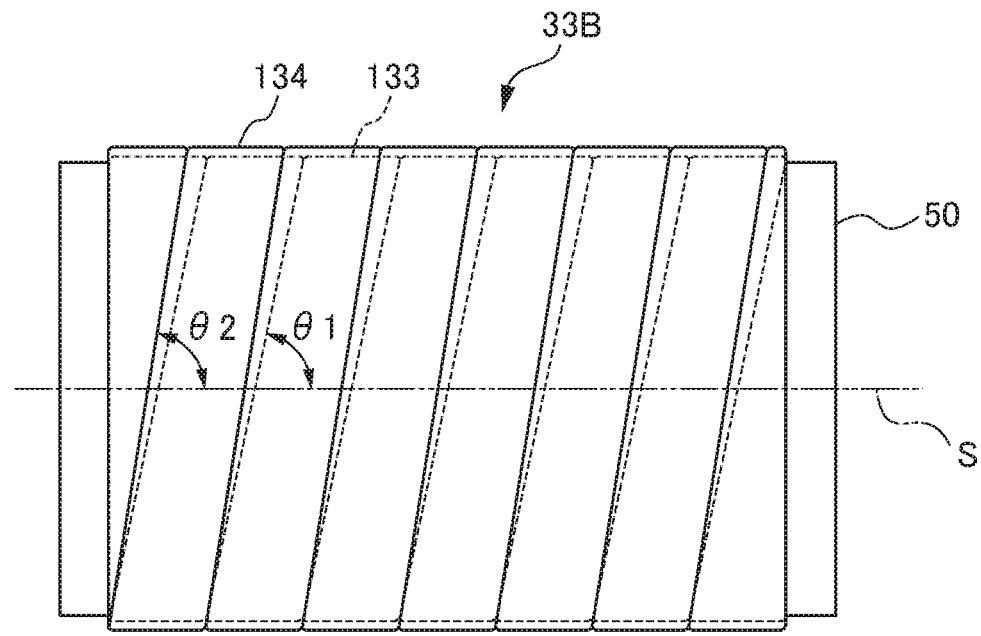
FIG. 5A is a schematic diagram showing a first configuration of a cover tube 33B according to a third embodiment.
Figure 5B:
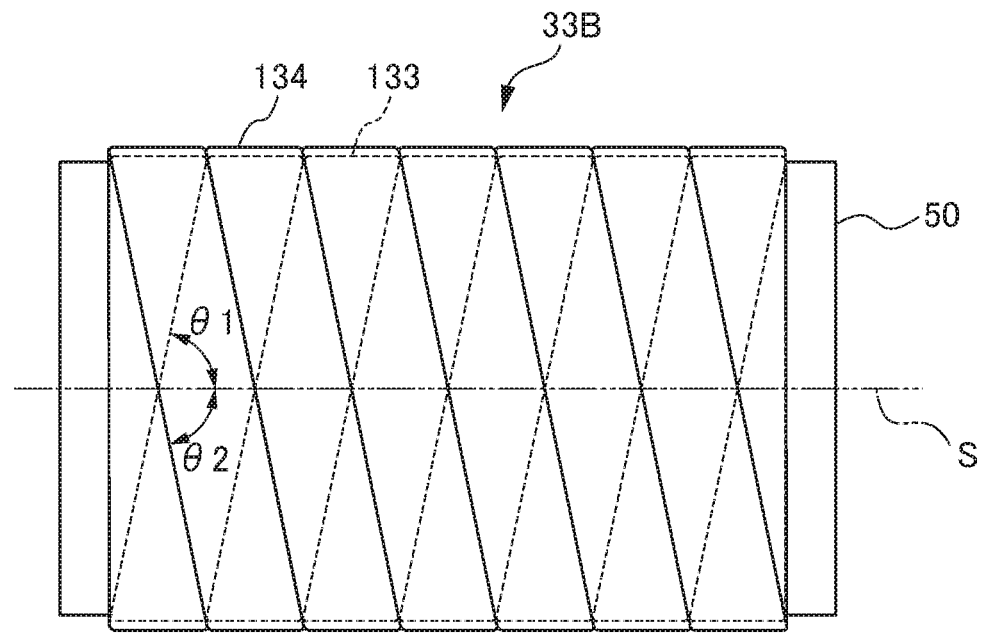
FIG. 5B is a schematic diagram showing a second configuration of a cover tube 33B according to a third embodiment.

Next, a cover tube 33B of the third embodiment will be explained. The cover tube 33B of the third embodiment, differs from the first embodiment in the point of being a 2-layer structure. In the cover tube 33B of the third embodiment, other configurations are the same as the first embodiment. For this reason, in FIGS. 5A and 5B, illustration of the rotor 30 to which the cover tube 33B is applied is omitted. In addition, in the explanations and drawings of the third embodiment, the same reference symbols as the first embodiment are attached to members, etc. that are similar to the first embodiment, and otherwise redundant explanations are omitted.

FIG. 5A is a schematic diagram showing a first configuration of the cover tube 33B according to the third embodiment. As shown in FIG. 5A, the cover tube 33B of the first configuration is molded by a first CFRP fiber bundle 133 being wound in a spiral pattern along the circumferential direction of the fixture 50, and a second CFRP fiber bundle 134 being wound in a spiral pattern on this layer in the same direction as the first CFRP fiber bundle 133. In the cover tube 331B of the first configuration, although not illustrated, for example, the winding-start end face 133s and winding-end end face 133e such as those shown in the first embodiment (refer to FIG. 3B) are formed in the winding-start and winding-end portions of the first CFRP fiber bundle 133 and second CFRP fiber bundle 134 (same for second configuration described later).

As shown in FIG. 5A, the first CFRP fiber bundle 133 circles in a spiral pattern continuously from one end to the other end in the axial direction of the cover tube 33B, on the outer circumferential surface of the fixture 50. The first CFRP fiber bundle 133 forms a first layer on the outer circumferential surface of the fixture 50. The second CFRP fiber bundle 134 circles in a spiral pattern continuously from one end to the other end in the axial direction of the cover tube 33B on the outer circumferential surface of the first CFRP fiber bundle 133. The second CFRP fiber bundle 134 forms a second layer on the outer circumferential surface of the first layer (first CFRP fiber bundle 133).

In the cover tube 33B of the first configuration, the angle θ2 at which the longitudinal direction of the second CFRP fiber bundle 134 intersects with the rotary axis line S of the fixture 50 is set so as to be greater than the angle θ1 at which the longitudinal direction of the first CFRP fiber bundle 133 intersects with the rotary axis line S of the fixture 50 (θ2>θ1). For example, if the angle θ1 of the first CFRP fiber bundle 133 is 85°, the angle θ2 of the second CFRP fiber bundle 134 is set to 87°.

According to the cover tube 33B of the first configuration, since the angle θ1 of the first CFRP fiber bundle 133 and the angle θ2 of the second CFRP fiber bundle 134 differ, it is possible to further widen the angular range at which stresses are accepted by the fibers, compared to a case of establishing the angle θ2 and angle θ2 as the same angle. According to this, it is possible to further raise the strength in the circumferential direction and axial direction of the cover tube 33B. In particular, by the strength in the axial direction of the cover tube 33B becoming higher, it is possible to ensure the strength in the axial direction upon mounting the cover tube 33B to the rotor 30. In addition, after mounting the cover tube 33B to the rotor 30, it is possible to more effectively suppress falling off of the permanent magnets 32 from the rotor 30. It should be noted that, in the configuration of the present embodiment, the angle θ1 of the first CFRF fiber bundle 133 may be set so as to be larger than the angle θ2 of the second CFRP fiber bundle 134 (θ1>θ2).

FIG. 5B is a schematic diagram showing a second configuration of the cover tube 33B according to the third embodiment. As shown in FIG. 5B, the cover tube 33B of the second configuration is molded by the first CFRP fiber bundle 133 being wound in a spiral pattern along the circumferential direction of the fixture 50, and the second CFRP fiber bundle 134 being wound in a spiral pattern on this layer in the opposite direction to the first CFRP fiber bundle 133.

In the cover tube 33B of the second configuration, the angle θ1 at which the longitudinal direction of the first CFRP fiber bundle 133 intersects with the rotary axis line S of the fixture 50 is set, so as to be the same angle (θ1=θ2) as the angle θ2 at which the longitudinal direction of the second CFRP fiber bundle 134 intersects with the rotary axis line S of the fixture 50.

According to the cover tube 33B of the second configuration, since the second CFRP fiber bundle 134 is wound in the opposite direction to the CFRP fiber bundle 133 on the top layer of the first CFRP fiber bundle 133, the fibers of the first CFRP fiber bundle 133 and the fibers of the second CFRP fiber bundle 134 will not intertwine with each other. According to this, since it is possible to wind the fibers included in the respective layers of fiber bundles around the fixture 50 in a more extended state, the fibers can accept a greater force. Therefore, it is possible to further raise the strength in the circumferential direction and axial direction also in the cover tube 33B of the second configuration. In particular, by the strength in the axial direction of the cover tube 33B becoming higher, it is possible to maintain the strength in the axial direction upon mounting the cover tube 33B to the rotor 30. In addition, after mounting the cover tube 33B on the rotor 30, it is possible to more effectively suppress falling off of the permanent magnets 32 from the rotor 30.

It should be noted that, in the cover tube 33B of the second configuration, the angle θ1 of the first CFRP fiber bundle 133 may be set so as to be greater than the angle θ2 of the second CFRP fiber bundle 134 (θ1>θ2), and the angle θ2 of the second CFRP fiber bundle 134 may be set so as to be greater than the angle θ1 of the first CFRP fiber bundle 133 (θ2>θ1).

Fourth Embodiment

Next, a cover tube 33C of a fourth embodiment will be explained. The cover tube 33C of the fourth embodiment differs from the first embodiment in the point of being a 2-layer structure, and the width and thickness of the CFRP fiber bundles differing for each layer. In the cover tube 33C of the fourth embodiment, other configurations are the same as the first embodiment. For this reason, FIG. 6 omits illustration of the rotor 30 to which the cover tube 33C is applied. In addition, in the explanations and drawings of the fourth embodiment, the same reference symbols as the first embodiment are attached to members, etc. that are similar to the first embodiment, and otherwise redundant explanations are omitted.

Figure 6:
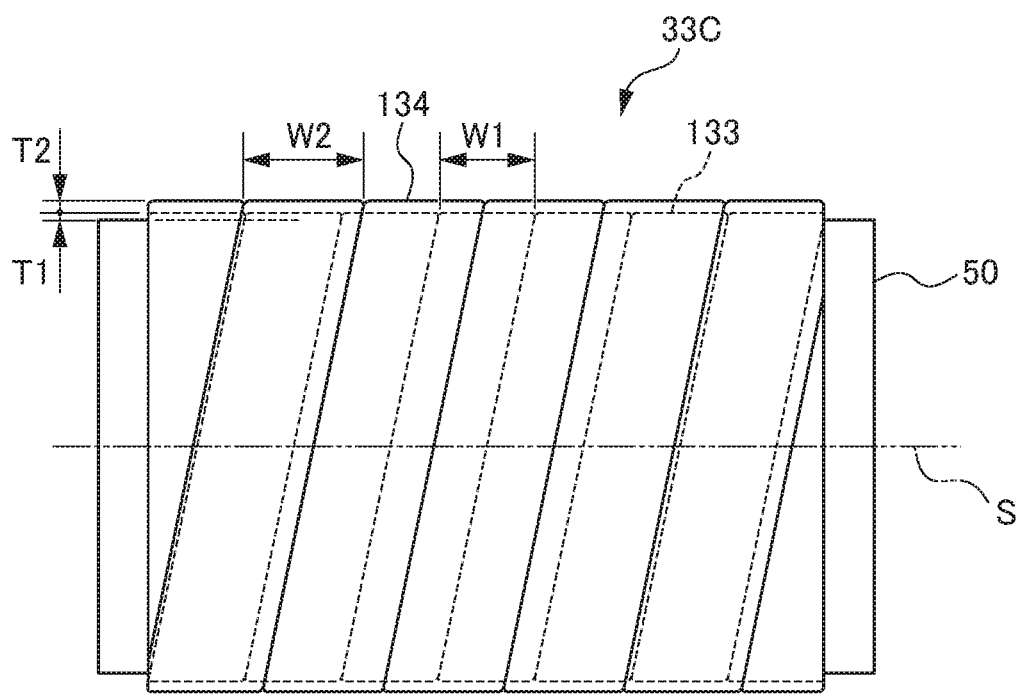
FIG. 6 is a schematic diagram showing the configuration of a cover tube 33C according to a fourth embodiment.

FIG. 6 is a schematic diagram showing the configuration of the cover tube 33C according to the fourth embodiment. As shown in FIG. 6, the cover tube 33C of the fourth embodiment is molded by the first CFRP fiber bundle 133 being wound in a spiral pattern along the circumferential direction of the fixture 50, and on the top layer thereof, the second CFRP fiber bundle 134 being wound in a spiral pattern in the same direction as the first CFRP fiber bundle 133. In the cover tube 33C of the fourth embodiment, at the winding-start and winding-end portions of the first CFRP fiber bundle 133 and second CFRP fiber bundle 134, although not illustrated, the winding-start end face 133s and winding-end end face 133e such as those shown in the first embodiment (refer to FIG. 3B) are formed, for example.

As shown in FIG. 6, the first CFRP fiber bundle 133 circles in a spiral pattern continuously from one end to the other end in the axial direction of the cover tube 33C on the outer circumferential surface of the fixture 50. The first CFRP fiber bundle 133 forms a first layer on the outer circumferential surface of the fixture 50. The second CFRP fiber bundle 134 circles in a spiral pattern continuously from the one end to the other end in the axial direction of the cover tube 33C on the outer circumferential surface of the first CFRP fiber bundle 133. The second CFRP fiber bundle 134 forms a second layer on the outer circumferential surface of the first layer (first CFRP fiber bundle 133).

The cover tuber 33C of the fourth embodiment is set so that the width W2 of the second CFRP fiber bundle 134 is wider than the width W1 of the first CFRP fiber bundle 133 (W2>W1). For example, if the width W1 of the first CFRP fiber bundle 133 is 4 mm, the width W2 of the second CFRP fiber bundle 134 is set to 6 mm.

In addition, the cover tube 33C of the fourth embodiment is established so that the thickness T2 of the second CFRP fiber bundle 134 is thicker than the thickness T1 of the first CFRP fiber bundle 133 (T2>T1). For example, if the thickness of the first CFRP fiber bundle 133 is 0.1 mm, the thickness T2 of the second CFRP fiber bundle 134 is set to 0.12 mm. It should be noted that the fiber bundle can be set to any thickness by combining the fiber diameter and number of fibers as appropriate. For example, even if the same number of fibers, it is possible to thicken the fiber bundle if making the fiber diameter fatter, and even if the same fiber diameter, it is possible to thicken if increasing the number of fibers.

In the cover tube 33C of the fourth embodiment, the first CFRP fiber bundle 133 and second CFRP fiber bundle 134 differ in width and thickness; therefore, it is possible to further optimize the strength of the cover tube 33C compared to a case of making the width and thickness of the CFRP fiber bundles of a 2-layer structure as the same dimensions. It should be noted that, in the configuration of the present embodiment, it may be set so that the width W1 of the first CFRP fiber bundle 133 wider than the width W2 of the second CFRP fiber bundle 133 (W1>W2). In addition, it may be set so that the thickness T1 of the first CFRP fiber bundle 133 is thicker than the thickness T2 of the second CFRP fiber bundle 134 (T1>T2).

Fifth Embodiment

Next, a cover tube 33D of the fifth embodiment will be explained. The cover tube 33D of the fifth embodiment differs from the first embodiment in the point of side face of the CFRP fiber bundle being arranged to overlap along the axial direction, and arranged at intervals. In the cover tube 33D of the fifth embodiment, the other configurations are the same as the first embodiment. For this reason, FIGS. 7A to 7C omit illustration of the rotor 30 to which the cover tube 33D is applied. In addition, in the explanations and drawings of the fifth embodiment, the same reference symbols as the first embodiment are attached to members, etc. that are similar to the first embodiment, and otherwise redundant explanations are omitted.

Figure 7A:
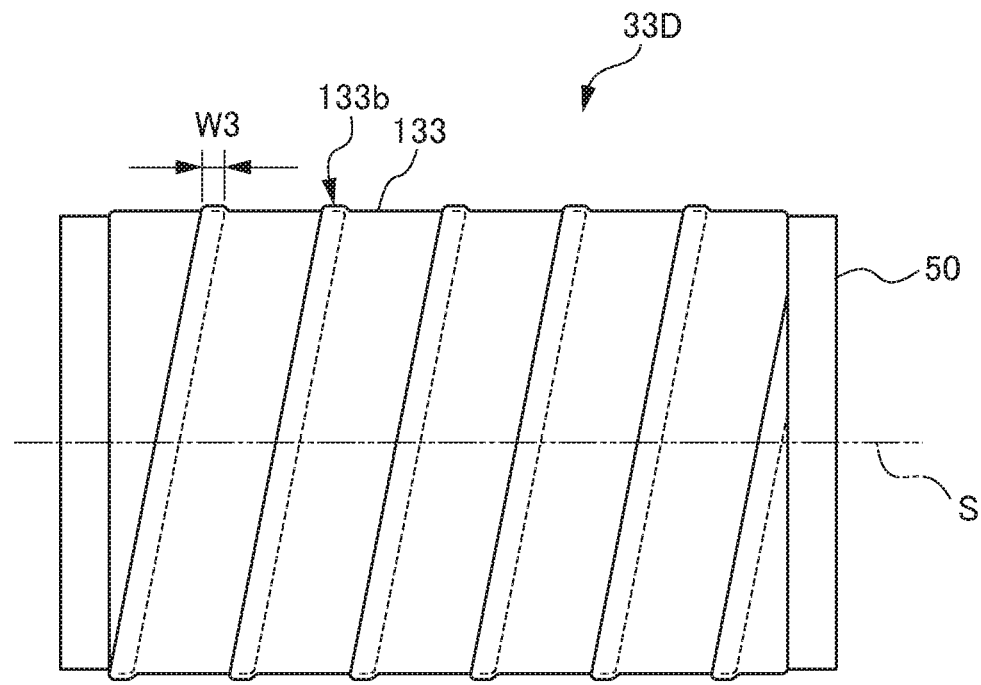
FIG. 7A is a schematic diagram showing a first configuration of a cover tube 33D according to a fifth embodiment.

FIG. 7A is a schematic diagram showing a first configuration of the cover tube 33D according to the fifth embodiment. As shown in FIG. 7A, in the cover tube 33D of the first configuration, the CFRP fiber bundle 133 circles in a spiral pattern continuously from one end to the other end in the axial direction of the cover tube 33D, and is arranged so that the side faces overlap each other along the axial direction. A stepped part 133b is formed at the portion at which the CRFP fiber bundle 133 overlaps. In the cover tube 33D of the first configuration, the width W3 by which the CFRP fiber bundle 133 overlaps is set in the range of 0.1 to 1 mm, for example.

In the cover tube 33D of the first configuration, in winding-start and winding-end portions of the CRFP fiber bundle 133, although not illustrated, the winding-start end face 133s and winding-end end face 133e such as those shown in the first embodiment (refer to FIG. 3B) are formed (same for second configuration and third configuration described later).

Also in the aforementioned cover tube 33D of the first configuration, both end faces of the CFRP fiber bundle 133 face the axial direction, and the cut surfaces are not exposed in the circumferential direction DR of the rotor 30 (refer to FIG. 2). For this reason, similarly to the first embodiment, it is possible to suppress a decline in strength of the cover tube 33D and the end face of the CFRP fiber bundle 133 from peeling off. In addition, in the cover tube 33D of the first configuration, since the first CFRP fiber bundle 133 arranges so that the side faces overlap each other along the axial direction, it is possible to further raise the density of fibers in the circumferential direction of the cover tube 33D.

Figure 7B:
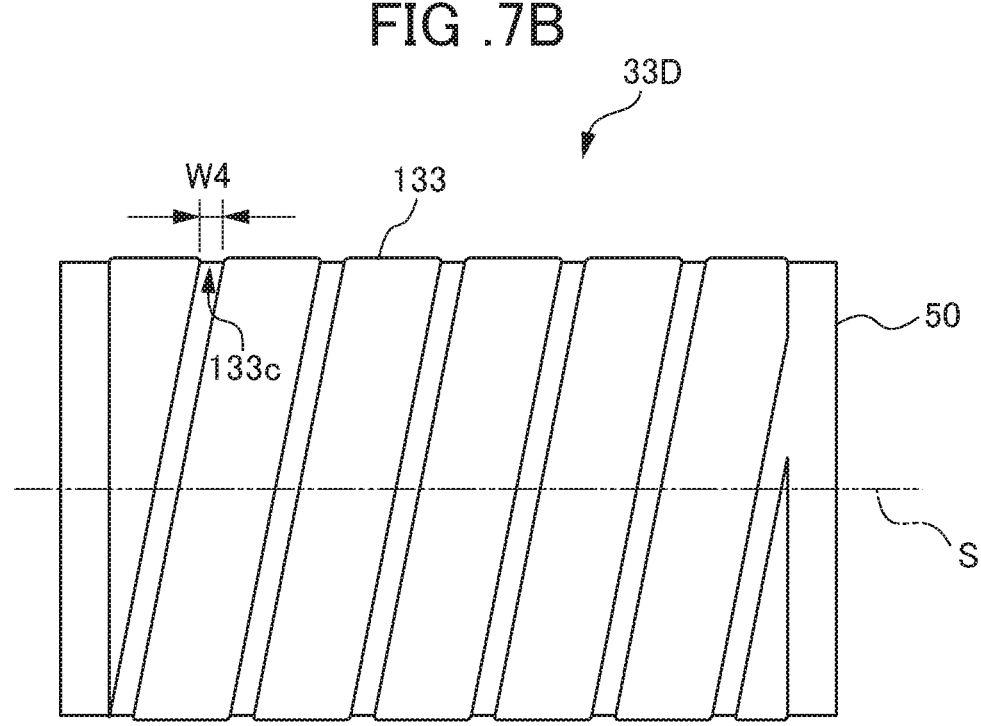
FIG. 7B is a schematic diagram showing a second configuration of a cover tube 33D according to a fifth embodiment.

FIG. 7B is a schematic diagram showing the second configuration of the cover tube 33D according to the fifth embodiment. As shown in FIG. 7B, in the cover tube 33D of the second configuration, the CFRP fiber bundle 133 circles in spiral pattern continuously from one end to the other end in the axial direction of the cover tube 33D, and arranges at intervals along the axial direction. An gap part 133c is formed in a portion in which the CFRP fiber bundle 133 does not overlap. In the cover tube 33D of the second configuration, a width W4 of the gap part 133c in which the CFRP fiber bundle 133 does not overlap is set in the range of 0.1 to 1 mm, for example.

Also in the aforementioned cover tube 33D of the second configuration, both end faces of the CFRP fiber bundle 133 face the axial direction, and a cut surface is not exposed in the circumferential direction DR of the rotor 30 (refer to FIG. 2). For example, similarly to the first embodiment, it is possible to suppress a decline in strength of the cover tube 33D and the end face of the CFRP fiber bundle 133 from peeling off.

In addition, in the cover tube 33D of the second configuration, the CFRP fiber bundle 133 (hereinafter referred to simply as "fiber bundle") is arranged at an interval along the axial direction. According to the second configuration, since the overlapping portions of the fiber bundle do not protrude in a convex shape, as in the configuration in which the side faces of the fiber bundle overlap each other, even in the case of winding the fiber bundle in a plurality of layers, the portion protruding will not gradually becoming larger as the layers increase. For this reason, the second configuration can wind more fiber bundles compared to a configuration in which the sides face of fiber bundles overlap each other, in the case of winding a plurality of layers of fiber bundles. As a result thereof, when viewing the overlapped fiber bundles in a cross-section in the radial direction of the cover tube 3, it is possible to increase the number of fibers per unit area (cross-sectional area). According to this, in the case of establishing the gap between the outer circumference of the rotor 30 (permanent magnet 32) and the inner circumference of the stator 20 to be the same, it is possible to wind more fiber bundles by the cover tube 33D, compared to a configuration in which the side faces of fiber bundles overlap each other. For this reason, according to the second configuration, it is possible to increase the strength of the cover tube 33D.

In addition, according to the second configuration, since it is possible to roll the fiber bundle on a relatively smooth surface, without the overlapping portions of the fiber bundle protruding in a convex shape, in the case of winding a plurality of layers of fiber bundles, slack will hardly occur in the top-layer fiber bundle by a convexly protruding portion of the bottom-layer fiber bundle, and it is possible to roll the fiber bundle to extend in any layer generally. For this reason, according to the second configuration, it is possible to suppress slack in the wound fiber bundle. It should be noted that, according to the second configuration, even assuming a case of there being a gap in the bottom-layer fiber bundle, the top-layer fiber bundle will not go into the gap in the bottom-layer fiber bundle due to the top-layer fiber bundle always intersecting the bottom-layer fiber bundle.

FIG. 7C is a schematic diagram showing a third configuration of a cover tube 33D of a fifth embodiment. As shown in FIG. 7C, the cover tube 33D of the third configuration is molded by the first CFRP fiber bundle 133 being wound in a spiral pattern along the circumferential direction of the fixture 50, and on the top layer thereof, the second CFRP fiber bundle 134 being wound in a spiral pattern in the same direction as the first CFRP fiber bundle 133.

In the cover tube 33D of the third configuration, the first CFRP fiber bundle 133 circles in a spiral pattern continuously from the one end to the other end in the axial direction of the cover tube 33D, as well as arranging so that side faces overlap each other along the axial direction. The first CFRP fiber bundle 133 forms a first layer on the outer circumferential surface of the fixture 50. The first CFRP fiber bundle 133 circles at a winding pitch P1. The stepped part 133b is formed at a portion at which the first CFRP fiber bundle 133 overlaps.

In addition, in the cover tube 33D of the third configuration, the second CFRP fiber bundle 134 circles in a spiral pattern continuously from the one end to the other end in the axial direction of the cover tube 33D, as well as arranging at intervals in the axial direction. The second CFRP fiber bundle 134 forms the second layer on the outer circumferential surface of the first layer (first CFRP fiber bundle 133). The second CFRP fiber bundle 134 circles at the winding pitch P2. An gap part 133c is formed in a portion in which the second CFRP fiber bundle 134 does not overlap.

In the third configuration, the winding pitch P1 of the first CFRP fiber bundle 133 and the winding pitch P2 of the second CFRP fiber bundle 134 are set so as to be the same (P1=P2). For this reason, in the cover tube 33D of the third configuration, the stepped part 133b in the portion at which the first CFRP fiber bundle 133 overlaps is arranged so as to go in between the gap part 133c of the second CFRP fiber bundle 134.

According to the cover tube 33D of the third configuration, the stepped part 133b formed at the portion in which the first CFRP fiber bundle 133 overlaps is arranged so as to go in between the gap part 133c of the second CFRP fiber bundle 134. For this reason, the stepped part 133b formed in the first CFRP fiber bundle 133 assumes a form not projecting at the outer circumferential surface of the cover tube 33D. According to this, even in a case of arranging the first CFRP fiber bundle 133 so that the side faces overlap with each other in the axial direction, in order to further raise the density of fibers in the circumferential direction, the stepped part 113b formed in the first CFRP fiber bundle 133 can keep the outside diameter dimension of the cover tube 33D more uniformly due to not projecting to the outer circumferential surface of the cover tube 33D.

Although embodiments of the present invention have been explained above, the present invention is not to be limited to the aforementioned embodiments, various modifications and changes are possible as in the modified embodiments described later, and these are also included within the technical scope of the present invention. In addition, the effects described in the embodiments are merely exemplifying the most preferred effects produced from the present invention, and are not limited to the effects described in the embodiments. It should be noted that the aforementioned embodiments and modified embodiments described later can be used by combining as appropriate; however, a detailed explanation will be omitted.

Modified Embodiments

In the second configuration (refer to FIG. 7B) of the fifth embodiment, the width W4 of the gap part 133c may be modified according to the winding number of the CFRP fiber bundle 133, and may be partially modified in the axial direction of the cover tube 33D. As in the second configuration of the fifth embodiment, the configuration of the cover tube 33D arranging with an interval on the side face of the CFRP fiber bundle 133 along the axial direction can be applied also to the cover tube of a 2-layer structure shown in the third embodiment (refer to FIG. 5A and FIG. 5B) and the fourth embodiment (refer to FIG. 6), for example. In this case, in the first layer (first CFRP fiber bundle 133) and second layer (second CFRP fiber bundle 134), the width W4 of the gap part 133c may be set as respectively different dimensions. In the cover tube of the 2-layer structure shown in the third to fifth embodiments, the materials such as carbon fiber and resin forming the first CFRP fiber bundle 133 and second CFRP fiber bundle 134 may be changed.

In the first configuration (FIG. 7A) of the fifth embodiment, the gap part 133c in which the CFRP fiber bundle 133 does not overlap may be partially formed, and in the second configuration (FIG. 7B) of the fifth embodiment, the stepped part 133b in which the CFRP fiber bundle 133 overlaps may be partially formed.

In the embodiment, the sleeve 31 is explained as the rotary member constituting the rotor 30 as an example; however, it is not limited thereto. In the configuration arranging permanent magnets not going through the sleeve 31 on the outer circumferential side of the rotary shaft 35, the rotary member may be the rotary shaft 35.

In the embodiment, an example of molding the cover tube 33 by winding the CFRP fiber bundle 133 on the outer circumferential surface of the fixture 50 is explained; however, it is not limited thereto. The cover tube 33 may be molded by directly winding the CRFP fiber bundle 133 on the outer circumferential side of the permanent magnets 32 (refer to FIG. 2).

EXPLANATION OF REFERENCE NUMERALS

1: electric motor
20: stator
30: rotor
31: sleeve
32: permanent magnet
33, 33A, 33B, 33C, 33D: cover tube
35: rotary shaft
50: fixture
133: CFRP fiber bundle (tape-like fiber bundle), 133a: thread-like CFRP, 133b: stepped part, 133c: gap part, 133s: winding-start end face, 133e: winding-end end face, 134: second CFRP fiber bundle

What is claimed is:
1. A rotor, comprising:
a rotary member;
a plurality of permanent magnets arranged on an outer circumferential side of the rotary member; and
a cover tube provided on an outer circumferential surface side of the plurality of the permanent magnets, and formed by a tape-like fiber bundle in which a plurality of thread-like fibers aligned in one direction is bundled smoothly by resin,
wherein the cover tube is formed so that the tape-like fiber bundle circles in a spiral pattern along a circumferential direction, and the tape-like fiber bundle arranges along an axial direction, and
wherein a circling-start end face and a circling-end end face of the tape-like fiber bundle are cut sections formed obliquely relative to a longitudinal direction of the tape-like fiber bundle, and face a rotary axis of the rotor.

2. The rotor according to claim 1,
wherein, in the cover tube, the tape-like fiber bundle is arranged at intervals so as not to overlap along the axial direction.

3. The rotor according to claim 1,
wherein the cover tube includes:
a first layer in which the tape-like fiber bundle circles in a spiral pattern continuously from one end to the other end in the axial direction; and
a second layer in which the tape-like fiber bundle circles in a spiral pattern continuously from the other end to the one end in the axial direction,
wherein the first layer and the second layer are alternately layered in the radial direction of the cover tube.

4. The rotor according to claim 3,
wherein, in the cover tube, the tape-like fiber bundle forming the first layer and the tape-like fiber bundle forming the second layer have respectively different angles of intersecting with the axial direction.

5. The rotor according to claim 3,
wherein, in the cover tube, the tape-like fiber bundle forming the first layer and the tape-like fiber bundle forming the second layer have respectively different widths.

6. The rotor according to claim 3,
wherein, in the cover tube, the tape-like fiber bundle forming the first layer and the tape-like fiber bundle forming the second layer have respectively different thicknesses.

7. A rotating electric machine comprising:
the rotor according to claim 1; and
a stator provided at the outer circumferential side of the rotor.

* * * * *